(12) United States Patent
Zeman et al.

(10) Patent No.: US 7,383,443 B2
(45) Date of Patent: Jun. 3, 2008

(54) SYSTEM AND METHOD FOR OBFUSCATING CODE USING INSTRUCTION REPLACEMENT SCHEME

(75) Inventors: Pavel Zeman, Kirkland, WA (US); Michael D. Marr, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 992 days.

(21) Appl. No.: 10/185,658

(22) Filed: Jun. 27, 2002

(65) Prior Publication Data

US 2004/0003264 A1 Jan. 1, 2004

(51) Int. Cl.
*G06F 21/00* (2006.01)
*G06F 12/14* (2006.01)

(52) U.S. Cl. .............. 713/190; 713/167; 713/186; 713/193; 713/194; 726/15; 726/26; 717/118

(58) Field of Classification Search ............. 713/190, 713/167, 186, 193, 194; 726/15, 26; 717/118
See application file for complete search history.

(56) References Cited

U.S. PATENT DOCUMENTS

| | | | | |
|---|---|---|---|---|
| 5,758,162 A * | 5/1998 | Takayama et al. | .......... | 717/151 |
| 6,014,740 A * | 1/2000 | Shearer, Jr. | .......... | 712/233 |
| 6,044,223 A * | 3/2000 | McCulloch et al. | .......... | 717/154 |
| 6,526,456 B1 * | 2/2003 | Allan et al. | .......... | 719/328 |
| 6,643,775 B1 * | 11/2003 | Granger et al. | .......... | 713/190 |
| 6,643,842 B2 * | 11/2003 | Angel et al. | .......... | 717/130 |
| 6,668,325 B1 * | 12/2003 | Collberg et al. | .......... | 713/194 |
| 6,779,114 B1 * | 8/2004 | Chow et al. | .......... | 713/189 |
| 7,047,394 B1 * | 5/2006 | Van Dyke et al. | .......... | 712/209 |
| 7,111,285 B2 * | 9/2006 | Smith et al. | .......... | 717/140 |
| 7,200,668 B2 * | 4/2007 | Mak et al. | .......... | 709/230 |
| 7,200,842 B1 * | 4/2007 | Susser et al. | .......... | 717/159 |
| 7,203,931 B2 * | 4/2007 | Minamide et al. | .......... | 717/136 |
| 7,263,722 B1 * | 8/2007 | Luo et al. | .......... | 726/26 |
| 2002/0095661 A1 * | 7/2002 | Angel et al. | .......... | 717/130 |
| 2003/0046563 A1 * | 3/2003 | Ma et al. | .......... | 713/190 |
| 2003/0070086 A1 * | 4/2003 | Blondel et al | .......... | 713/200 |
| 2003/0204374 A1 * | 10/2003 | Madsen et al. | .......... | 702/186 |
| 2003/0236986 A1 * | 12/2003 | Cronce et al. | .......... | 713/189 |
| 2005/0210275 A1 * | 9/2005 | Homing et al. | .......... | 713/190 |

OTHER PUBLICATIONS

Barak, B. et al., "On the (Im)possibility of Obfuscating Programs", (Extended Abstract), *Advances In Cryptology-Crypto 2001, 21st Annual International Cryptology Conference*, Santa Barbara, California, USA, 2001,1-18.

(Continued)

*Primary Examiner*—Carl Colin
(74) *Attorney, Agent, or Firm*—Woodcock Washburn LLP

(57) ABSTRACT

A technique for obfuscating code. A list of one-byte instructions for a particular processor is created. Bytes in a function to be obfuscated are randomly selected, and these bytes are replaced with one-byte instructions from the list. A table that identifies the replaced bytes and their original values is inserted into the executable that contains the function. When the function is called, the function is deobfuscated by consulting the table to restore the replaced bytes to their original values.

20 Claims, 9 Drawing Sheets

OTHER PUBLICATIONS

Hada, S. "Zero-Knowlegde and Code Obfuscation", *Advances in Cryptology-ASIACRYPT 2000, 6th International Conference on the Theory and Application of Cryptology and Information Security,* 2000, 443-457.

Jalali-Sohi, M. et al., "An Intergrated Secure Web Architecture For Protected Mobile Code Distribution", *Communications and Multimedia Security Issues of the New Century, 5th Joint Working Conference on Communications and Multimedia Security,* 2001, 1-13.

* cited by examiner

|  | Mnemonic Representation | | Numeric Code | |
|---|---|---|---|---|
| 210 | ADD<br>Opcode (211) | R1, R2<br>Params. (212) | 50<br>Opcode (213) | 01 02<br>Params. (214) |
| 220 | JNZ<br>Opcode (221) | R1, _label<br>Params. (222) | 46<br>Opcode (223) | 01 00 41 6C 3F<br>Params. (224) |
| 230 | ADD3<br>Opcode (231) | R1, R2, R3<br>Params. (232) | FF 01<br>Opcode (233) | 01 02 03<br>Params. (234) |

*FIG. 2*

| | Mnemonic Representation (301) | Description (302) | Numeric Opcode (303) |
|---|---|---|---|
| 310 | RET | Return from subroutine call | C3 |
| 320 | INC EDX | Increment register EDX by 1 | 42 |
| 330 | DEC EBP | Decrement register EBP by 1 | 4D |

*FIG. 3*

Program 400

| 55 | 8B | EC | 83 | EC | 58 | (83) | (7D) |
|----|----|----|----|----|----|------|------|
| 18 | 00 | 74 | 10 | 6A | (04) | 8B | 45 |
| 18 | (50) | FF | 15 | (3C) | 10 | 60 | 66 |
| (85) | C0 | 74 | 0A | B8 | 03 | 40 | 00 |
| 80 | E9 | 1A | 01 | 00 | 00 | 8B | 4D |
| 18 | C7 | 01 | (00) | 00 | 00 | 00 | 33 |
| D2 | (85) | D2 | 75 | D1 | 8B | 45 | 08 |
| 33 | C9 | (8A) | 48 | (0C) | 85 | C9 | 75 |
| 0A | B8 | 01 | 93 | 04 | 80 | E9 | F5 |
| 00 | 00 | 00 | | | | | |

= Replacement candidate (402)

Program 400

| 55 | 8B | EC | 83 | EC | 58 | (42) | (43) |
| 18 | 00 | 74 | 10 | 6A | (49) | 8B | 45 |
| 18 | (4D) | FF | 15 | (50) | 10 | 60 | 66 |
| (54) | C0 | 74 | 0A | B8 | 03 | 40 | 00 |
| 80 | E9 | 1A | 01 | 00 | 00 | 8B | 4D |
| 18 | C7 | 01 | (43) | 00 | 00 | 00 | 33 |
| D2 | (49) | D2 | 75 | D1 | 8B | 45 | 08 |
| 33 | C9 | (52) | 48 | (54) | 85 | C9 | 75 |
| 0A | B8 | 01 | 93 | 04 | 80 | E9 | F5 |
| 00 | 00 | 00 | | | | | |

*FIG. 5*

|  | Healing Table 600 | |
| --- | --- | --- |
| Function Index (602) | Offset (604) | Old Value (606) |
| 608 ⟋ 0 | 610 ⟋ 0x07 | 612 ⟋ 0x42 |
| 0 | 0x08 | 0x43 |
| 0 | 0x0E | 0x49 |
| . | . | . |
| . | . | . |
| . | . | . |

*FIG. 6*

SYSTEM AND METHOD FOR OBFUSCATING CODE USING INSTRUCTION REPLACEMENT SCHEME

FIELD OF THE INVENTION

The present invention relates generally to the field of computing, and, more particularly, to a technique for obfuscating executable code by selectively replacing bytes of code in a manner that gives the obfuscated code an appearance of being legitimate code.

BACKGROUND OF THE INVENTION

In some cases, it is desirable to hide the workings of a computer program. Many programs that are designed to perform legitimate functions could easily be modified to serve a malevolent purpose if a hacker could analyze the program and understand its workings. For example, if a program is designed to protect encrypted copyright material by decrypting the material only under conditions permitted by the copyright owner, a hacker could analyze this program and modify it to decrypt the material without restriction. One technique to protect software from this type of attack is to obscure or hide the operation of the software in order to complicate a hacker's attempt to analyze it; this technique is generically referred to as "code obfuscation."

Since machine code completely and deterministically defines what a computer will do, a person with sufficient time and motivation can disassemble the code and discover what the code does and how it works. Code obfuscation is based on the premise that, by making the code more convoluted, less straightforward, or less readable, the time and energy to analyze the code will be increased, thereby frustrating a hacker. There are a number of ways to accomplish this goal. For example, a simple algorithm may be buried within thousands of lines of "diversionary" code—i.e., code that hides the "real" algorithm by performing many computations that ultimately perform no useful result. As another example, code may be scrambled or encrypted, and then triggers may be inserted into the code that cause the code to be unscrambled or decrypted just before it is executed. Various other obfuscation techniques are known.

Existing obfuscation techniques, however, contain various drawbacks. Some obfuscation techniques—most notably, encryption or scrambling of code—telegraph to a potential hacker that the code has been obfuscated: since a disassembler would completely fail to recognize encrypted or scrambled code, the hacker would quickly be able to recognize that the code had been encrypted or scrambled, and could thus focus his attention on looking for the decryption or descrambling trigger. In many cases, it is best to hide the code "in plain sight" by making it look like "real" code. However, existing tools that employ this "plain sight" technique often rely on platform-specific code markers, and thus may be difficult to port from one processor to another.

In view of the foregoing, there is a need for an obfuscation technique that overcomes the drawbacks of the prior art.

SUMMARY OF THE INVENTION

The present invention provides a technique for obfuscating code. In order to obfuscate code, a particular function to be obfuscated is selected. Individual bytes in the function are selected for replacement, and those bytes are replaced with new values. The original bytes, and their offsets into the function, are saved in a table so that the function can later be "de-obfuscated" by restoring the bytes to their original values.

Preferably, the bytes for replacement are selected as follows: Given the processor on which the code is designed to run, a list of one-byte instructions is created for that processor. Bytes in the code to be obfuscated are then selected at random (except that bytes in the reloc list for the executable are avoided), and these bytes are replaced with instructions from the one-byte instruction list mentioned above. A set of one-byte instructions is available on a variety of processors; thus, the obfuscation technique can easily be ported from one platform to another simply by creating a list of such one-byte instructions for the new platform. Also, replacing one-byte instructions offers the advantage that the replacement results in relatively little disruption to the structure of the original machine code, so the obfuscated code may, upon disassembly, appear to be "real" code. This illusion that the code is "real" may complicate a hacker's attempt to analyze the code. If the hacker starts with the premise that any sensitive code (e.g., decryption functions, etc.) would be obfuscated, then he may have difficulty finding code that has been obfuscated according to the present invention, since it will not be immediately apparent that such code has been obfuscated.

Once a function has been obfuscated by replacing some of its bytes, the executable containing the function is adapted so that the obfuscated function can be used. The table that contains the original (pre-obfuscation) byte values is stored in the executable, and the function is modified so that a de-obfuscation routine is triggered before the function is called. The deobfuscation routine consults the table and restores the replaced bytes in the function to their original values. The function may be "re-obfuscated" after execution of the function is complete.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there are shown in the drawings exemplary constructions of the invention; however, the invention is not limited to the specific methods and instrumentalities disclosed. In the drawings:

FIG. 2 is a block diagram of exemplary executable instructions;

FIG. 3 is a block diagram of exemplary executable instructions that can be represented in a single byte;

FIG. 5 is a block diagram of the exemplary program shown in FIG. 4, with certain bytes having been replaced in accordance with an obfuscation technique of the present invention;

FIG. 6 is a block diagram of a healing table in accordance with the invention;

DETAILED DESCRIPTION OF THE INVENTION

Overview

As noted above, the workings of some computer programs are best kept secret. For example, some programs perform functions such as computer security, cryptography, or protection of copyrighted content. For these types of programs, there is a great incentive for a hacker to "break" the program. One way for a hacker to break such a program is to disassemble it and analyze how it works. Code obfuscation seeks to complicate the job of analyzing the program, thereby frustrating the hacker. Conventionally, obfuscated code may be scrambled or encrypted, and thus looks as random as "noise." By contrast, code that has been obfuscated in accordance with the present invention often looks very much like real code, which may be particularly frustrating to a hacker, since the hacker may spend time trying to locate or analyze code that he does not realize has been obfuscated.

The code obfuscation technique of the present invention is described below.

Exemplary Executable File Structure

Figure 1:
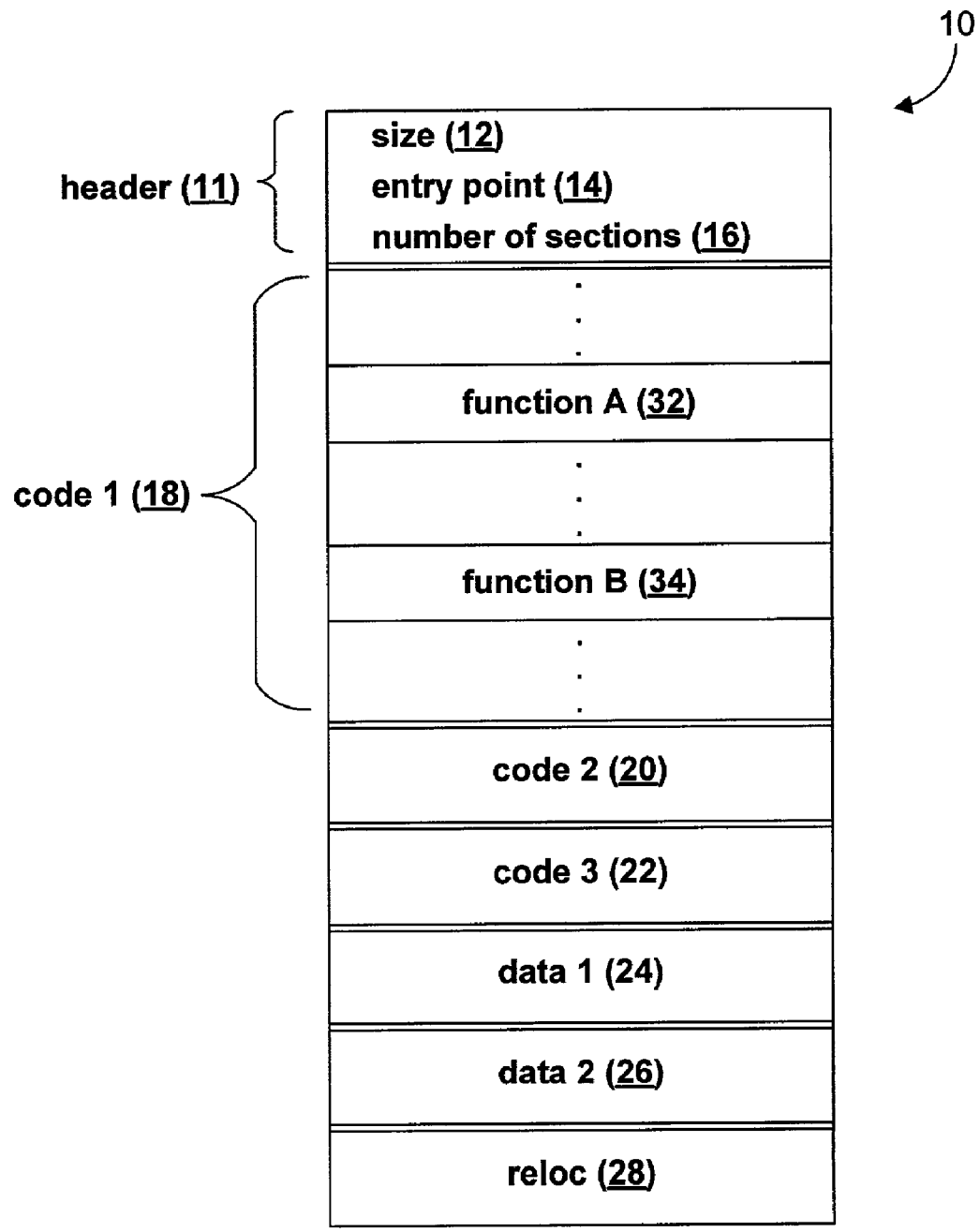
FIG. 1 is a block diagram of an exemplary executable file that may be obfuscated in accordance with the invention.

FIG. 1 shows the structure of an exemplary executable file 10, which may be obfuscated in accordance with the technique of the invention. Executable file 10 is typically a contiguous sequence of bytes, where the position of each byte in the file can be described by an offset 50. Thus, in the example of FIG. 1, the first byte in the file is described by the offset 0x0, the last byte in the file by offset 0x7000, and various points in the middle of the file by 0x100, 0x240, 0x750, etc. (As is known in the art, the symbol "0×" preceding a number means that the number is in hexidecimal.) Each of the offsets 50 shown in FIG. 1 is the first byte of the various segments of executable file 10. These segments are described below.

Executable file 10 comprises a header 11, which has several fields. Among these fields are size 12, entry point 14, and the number of sections 16. Size 12 is an integer that describes the size of executable file 10. Typically, the size of the file is expressed as a number of bytes. Entry point 14 identifies where, within executable file 10, execution of code should begin when the program is loaded. Number of sections 16 indicates the number of sections contained in executable file 10. In many executable formats (e.g., the Portable Executable ("PE") format used for executables in MICROSOFT WINDOWS operating systems), an executable file 10 may be divided into sections. Exemplary executable file 10 contains seven sections: three code sections 18, 20, and 22; two data sections 24, 26; and a "reloc" section 28.

Code sections 18, 20, and 22 contain the actual code that will be executed by a processor. Each code section typically contains one or more functions. For example, code section 18 contains function A (reference numeral 32) and function B (reference numeral 34). Code sections 20 and 22 may likewise contain one or more functions (not shown).

Data sections 24 and 26 contain data that is used by the code contained in executable file 10. For example, the program embodied in executable file 10 may define certain global or static variables (e.g., non-stack variables). These global or static variables may be stored in data sections 24 and/or 26.

"Reloc" section 28 contains a list of "absolute" addresses in executable file 10, which will need to be realigned by the loader in the event that executable file 10 cannot be loaded at its "preferred load address." As discussed below, the obfuscation technique discussed herein preferably uses the information contained in reloc section 28 to identify bytes that should not be obfuscated.

In order to understand what is in reloc section 28 and how it relates to the invention, it is necessary to understand the concept of a preferred load address, and how this concept relates to the contents of executable file 10. When executables are loaded into memory, they are preferentially aligned at a particular location in virtual memory. This preferred location is called the "preferred load address." The reason for this preference is that most executables contain at least some "absolute" addresses—i.e., numeric addresses of "absolute" locations in virtual memory at which data, functions, etc. are located. These "absolute" addresses will be valid only if the executable is aligned at its preferred load address. If the executable cannot be loaded at its preferred load address (e.g., because some other executable or data is already occupying that address), then the executable can still be executed, but the absolute addresses contained in the executable will need to be realigned to reflect the new load address. Thus, if an executable's preferred load address is 0x50000000 (i.e., the first byte in the executable is stored at virtual memory address 0x50000000), but the executable actually gets loaded at 0x60000000, then every absolute address in the executable must be increased by 0x10000000 at the time that the executable is loaded into virtual memory. Reloc section 28 contains a list of all of the absolute addresses contained in executable file 10 that need to be modified in this way if executable file 10 is not loaded at its preferred load address. As discussed below, if executable file 10 is not loaded at its preferred load address, then accounting for these changed absolute addresses complicates the de-obfuscation process. Thus, in a preferred embodiment of the invention, the obfuscation process looks in reloc section 28 to determine which bytes in executable file 10 contain absolute addresses, and skips over these bytes when selecting bytes to obfuscate.

Executable file 10 shows some of the exemplary structural features that are present in an executable that the invention can be employed to obfuscate. The obfuscation technique described below will refer to these features in cases where concrete examples add clarity to the description. However, it will be understood that the invention is not limited to the executable format shown in FIG. 1, the Portable Executable (PE) format, or any other executable format; as those of skill in the art will appreciate, the invention may be applied to any type of executable.

Exemplary Code

The obfuscation technique of the present invention is typically employed to obfuscate code contained in an executable file. As a prelude to discussing the obfuscation technique, FIGS. 2 and 3 show examples of the content of this obfuscatable code.

FIG. 2 shows three example lines of code. Each line is essentially an atomic unit of executable instruction, comprising an operation code (or "opcode") and, optionally, a set of parameters. In FIG. 2, these exemplary instructions, or lines of code, are labeled 210, 220, and 230, respectively. For each instruction, a "mnemonic representation" (e.g., assembly language) is shown on the left side of the solid line, and the actual numeric code for the instructions is shown on the right side of the solid line. The space-separated values shown in on the "numeric code" side are bytes written in hexidecimal. As is known in the art, the actual code that is executed by a computer is binary, and hexidecimal is merely a convenient way to write binary numbers. Thus, for example, the hexidecimal number "3A" stands for the binary number "00110101".

It should be noted that the exemplary instructions 210, 220, and 230 shown in FIG. 2 are not tied to any particular type of computer, but are merely examples that demonstrate some of the general features of executable code. This fact underscores the point that the obfuscation technique of the present invention is not limited to the machine language of any particular computer, but rather can be applied to the executable code for any type of computer processor.

As noted above, each instruction 210, 220, and 230 typically includes an operation code (or "opcode") and parameters. (Some instructions, such as a "return" instruction that returns from a subroutine call, may have no parameters. However, in the example shown in FIG. 2, all of the instructions have parameters.) Thus, instruction 210 comprises an opcode 211 ("ADD"), and parameters 212 ("R1, R2"). Instruction 210 might mean "add the contents of registers R1 and R2, and put the result in R1." The numeric representation of instruction 210 may be as follows: the numeric opcode 213 for the "ADD" instruction may be the byte Ox 50, and the numeric representation of parameters 214 may be 0x01 and 0x02, representing R1 and R2, respectively.

Instruction 220 is another example of an instruction, comprising an opcode 221 ("JNZ") and parameters 222 ("R1, _label"). Instruction 222 may be a "jump-on-not-zero" instruction, meaning "if R1 is not equal to zero, then jump to the address _label." The numeric representation of instruction 220 includes an opcode 223 and parameters 224. The numeric opcode ("46") corresponds to mnemonic opcode "JNZ," and the numeric parameters ("01 00 41 6C 3F") correspond to the mnemonic parameters "R1, _label." In this example, "_label" is a symbolic address that can be used by an assembler to represent a particular location in memory; in numeric code, this symbolic address is converted to an actual numeric address. Thus, the numeric representation parameters 224 includes an "01" representing register R1, four bytes ("00 41 6C 3F") representing the 32-bit address 3F6C4100 that corresponds to _label. (It will be observed that the bytes that make up an address appear "backward" from the address that those bytes represents. In typical machine languages, numbers (including addresses) are written, with their least significant byte appearing first, which is backward from how numbers are normally represented in writing. Thus, while the "00" byte appears last in the written address, it appears first in the machine-language representation of that address.) It should be noted that the numeric code for _label ("00 41 6C 3F") is an example of an "absolute address," which would have to be changed if the code of FIG. 2 could not be loaded at its preferred load address. Thus, these four bytes are typically represented in reloc section 28, described above.

Instruction 230 is another example of an instruction containing an opcode 231 ("ADD 3") and parameters 232 ("R1, R2, R3"). This example instruction may mean "add the contents of registers R1 and R2, and store the result in register R3." The numeric representation of this instruction includes an opcode 233 ("FF 01"), and parameters 234 ("01 02 03"). In this example, "FF 01" corresponds to the "ADD3" opcode, and "01 02 03" corresponds to registers R1, R2, and R3, respectively. While instructions 210 and 220 have one-byte opcodes 213 and 223, instruction 230 demonstrates that not every opcode need be a single byte; opcode 233 is a two-byte opcode. It should also be noted that, even within the machine language for a single processor, different opcodes may have different numbers of bytes. Many modern computers, including those based on the INTELx86 or PENTIUM processors, use opcodes that have differing numbers of bytes.

Thus, instructions 210, 220, and 230 demonstrate that instructions may have different lengths, due to the fact that instructions may differ in: the sizes of their opcodes (e.g., opcodes 213 and 223 are each one byte, whereas opcode 233 is two bytes); the number of parameters (e.g., instructions 210 and 220 each have two parameters, whereas instruction 230 has three parameters); and the number of bytes that it takes to represent a parameters (e.g., R1 is represented in one byte, whereas _label is represented in four bytes). As discussed below, the obfuscation technique of the present invention advantageously "works around" these different types of instructions, regardless of the underlying machine language, by leveraging a particular type of instruction: the one-byte instruction.

FIG. 3 shows examples of one-byte instructions 310, 320, and 330. For each exemplary instruction, there is shown a mnemonic representation 301, a text description 302, and the numeric opcode 303. The exemplary instructions shown in FIG. 3 are in the machine language for the INTELx86 or PENTIUM family of processors. However, it will be understood that many different types of processors have one-byte instructions similar to those shown in FIG. 3.

For example, the mnemonic representation of the instruction 310 is "RET." This mnemonic means "return from a subroutine call." In INTELx86/PENTIUM machine language, this instruction is represented by the opcode 0xC3. Thus, the entire atomic unit to be executed is the single byte 0xC3.

Instruction 310 is a "parameter-less" instruction, since it does not take any arguments. However, not all one-byte instructions are without parameters. For example, consider instruction 320. The mnemonic for instruction 320 is "INC EDX," which means increment the EDX register by one. In INTELx86/PENTIUM machine language, this instruction is represented by the opcode 0x42. In greater generality, in the INTEL the instruction to increment a particular register is given by the formula:

0x40+<register number> where "register number" is a number in the range [0 . . . 7]. (The register number for the EDX register is 2.) Thus, the single byte 0x42 essentially encapsulates both the operation ("INC") and its parameter ("EDX"), such that the atomic "line" of code to be executed is a single byte of machine code.

Instruction 330 is another example of a single-byte instruction. The mnemonic for instruction 330 is "DEC EBP," which means "decrement the EBP register by 1. " The INTEL x86/PENTIUM opcode for this instruction is 0x4D. In general, in the INTEL architecture the instruction to pop the stack into a register is given mnemonic 0x48+<register number> where "register number" is, again, in the range [0 . . . 7]. (The register number for the EBP register is 5.)

As described below, the obfuscation technique of the present invention is preferably based on replacing randomly-selected bytes in an executable with one-byte instructions. Replacing these bytes with one-byte instructions is advantageous for a number of reasons—for example, the number of one-byte instructions is likely to be small so all of the potential replacement bytes can be listed in a relatively short array. Additionally, changing existing bytes to one-byte instructions is likely to result in relatively little disruption to the overall appearance of the code, which is an advantage because it makes the obfuscation more subtle and thus harder for a hacker to detect. However, despite these advantages, it is possible to obfuscate code in accordance with the invention by targeting something other than randomly-selected single bytes for replacement (e.g., targeting two- or three-byte sequences for replacement with two- or three-byte instructions). Thus, since the invention is not strictly limited to the replacement of individual bytes with one-byte instructions, and the description below shall provide, where appropriate, a discussion of how the invention can be modified work with something other than one-byte instructions.

Obfuscation of Code by Replacement of Instructions

The technique of the present invention obfuscates code by replacing bytes of machine code with one-byte instructions. Much of the original structure or "appearance" of the original code is retained, so that the obfuscated code, upon disassembly, may, at first glance, appear to be a legitimate, correct program. However, the change of some instructions in the code is likely to disrupt the logic of the program such that the obfuscated program would "crash" if one attempted to run it. An example of obfuscating code by replacing one-byte instructions is shown in FIGS. 4 and 5.

Figure 4:
FIG. 4 is a block diagram of an exemplary program, showing bytes that are candidates for replacement in accordance with an obfuscation technique of the present invention.

FIG. 4 shows an exemplary program 400 in machine language. Program 400 is, as described above in connection with FIGS. 2 and 3, a sequence of bytes that represent instructions. Program 400, in this example, is a function (called "functionA"), and its assembly language (i.e., "mnemonic") representation is shown in Table 1 below. Program 400 is in INTEL x86/PENTIUM machine language, although it should be understood that program 400 could be in the machine language of any processor.

TABLE 1

| MemLoc | Numeric | | Mnemonic |
|---|---|---|---|
| FunctionA: | | | |
| 66603BB1 | 55 | push | ebp |
| 66603BB2 | 8B EC | mov | ebp, esp |
| 66603BB4 | 83 EC 58 | sub | esp, 58h |
| 66603BB7 | 83 7D 18 00 | cmp | dword ptr [pdwHandle],0 |
| 66603BBB | 74 10 | je | FunctionA + 1Ch (66603bcd) |
| 66603BBD | 6A 04 | push | 4 |
| 66603BBF | 8B 45 18 | mov | eax, dword ptr [pdwHandle] |
| 66603BC2 | 50 | push | eax |
| 66603BC3 | FF 15 3C 10 60 66 | call | dword ptr[_imp__IsBadWritePtr@8 (6660103c)] |
| 66603BC9 | 85 C0 | test | eax,eax |
| 66603BCB | 74 0A | je | FunctionA + 26h (66603bd7) |
| 66603BCD | B8 03 40 00 80 | mov | eax, 80004003h |
| 66603BD2 | E9 1A 01 00 00 | jmp | e_Exit + 30h (66603cf1) |
| 66603BD7 | 8B 4D 18 | mov | ecx, dword ptr [pdwHandle] |
| 66603BDA | C7 01 00 00 00 00 | mov | dword ptr [ecx], 0 |
| 66603BE0 | 33 D2 | xor | edx, edx |
| 66603BE2 | 85 D2 | test | edx, edx |
| 66603BE4 | 75 D1 | jne | FunctionA + 6 (66603bb7) |
| 66603BE6 | 8B 45 08 | mov | eax, dword ptr [this] |

TABLE 1-continued

| MemLoc | Numeric | | Mnemonic |
|---|---|---|---|
| 66603BE9 | 33 C9 | xor | ecx, ecx |
| 66603BEB | 8A 48 0C | mov | cl, byte ptr [eax + 0Ch] |
| 66603BEE | 85 C9 | test | ecx, ecx |
| 66603BF0 | 75 0A | jne | FunctionA + 4Bh (66603bfc) |
| 66603BF2 | B8 01 93 04 80 | mov | eax, 80049301h |
| 66603BF7 | E9 F5 00 00 00 | jmp | e_Exit + 30h (66603cf1) |

In Table 1, each line represents an instruction. The "MemLoc" column is the memory location at which an instruction begins. The "numeric" column is the bytes that represent the instruction in numeric machine code. The "mnemonic" column is the mnemonic or "assembly language" representation of the instruction. Thus, the program 400 shown in FIG. 4 is essentially the bytes in the "numeric" column of Table 1 laid end-to-end.

As explained above, one advantage the invention provides is the ease of portability between different platforms—i.e., the ability to apply the obfuscation technique to code designed to run on a wide variety of processors. In this regard, it should be noted that the function to be obfuscated, such as "FunctionA" shown in Table 1, can be located in executable 10 (shown in FIG. 1) in a relatively machine-independent manner—that is, without relying on platform-specific markers. (The location within executable 10 of the function to be obfuscated must be determined so that the tool that performs the obfuscation knows the intervals within executable 10 from which it may select bytes to obfuscate.) A relatively platform-independent manner of locating a function within an executable is to use the MAP file that is produced by the linker.

The following is an example of the structure of a map file:

| Address | Publics by Value | Rva + Base | Lib:Object |
|---|---|---|---|
| 0001:0000eb65 | _A_SHAFinal | 1000fb65 f | rsa32:sha.obj |
| 0001:0000eb7f | _BSafeEncPublic | 1000fb7f f | rsa32:rsa_pub.obj |
| 0001:0000ec14 | _A_SHAInit-Common | 1000fc14 f | rsa32:shacomm.obj |
| 0001:0000ec43 | _A_SHAUpdateCommon | 1000fc43 f | rsa32:shacomm.obj |

In a preferred embodiment, in order to determine where in executable 10 a particular function (_BsafeEncPublic, in this example) is located, the tool that performs the obfuscation parses the whole map file, finds the occurrence of the function/data symbol name in the second column, parses the first column (which is the address of the symbol in the binary) and computes the size by subtracting the current address from the address of the next symbol. The last column shows what library the symbol is from and which object file contains the source code. In the example above, _BSafeEncPublic is at the offset 0xeb7f and its size is 0xec14−0xeb7f=0x95 (149 bytes).

Assuming that the function to be obfuscated has been located within executable 10, the tool that performs the obfuscation technique of the present invention proceeds to obfuscate the selected function. As noted above, a particularly advantageous embodiment of the invention obfuscates code by replacing randomly-selected bytes with one-byte instructions. The bytes that are randomly selected for replacement shall be referred to herein as "replacement candidates," and these bytes will be replaced with one-byte instructions. Thus, a list of the one-byte instructions for the relevant machine lexicon should be available. In the example of FIG. 4 and Table 1, the relevant lexicon is INTEL x86/PENTIUM machine language. Table 2 contains a list of all of the one-byte instructions for an INTEL x86/PENTIUM processor:

TABLE 2

| 0xCC, | 0xC3, | 0xC9, | 0x90, | // int3, ret, leave, nop | | | | |
|---|---|---|---|---|---|---|---|---|
| 0x40, | 0x41, | 0x42, | 0x43, | 0x44, | 0x45, | 0x46, | 0x47, | //inc... |
| 0x48, | 0x49, | 0x4A, | 0x4B, | 0x4C, | 0x4D, | 0x4E, | 0x4F, | //dec... |
| 0x50, | 0x51, | 0x52, | 0x53, | 0x54, | 0x55, | 0x56, | 0x57, | //push... |
| 0x58, | 0x59, | 0x5A, | 0x5B, | 0x5C, | 0x5D, | 0x5E, | 0x5F, | //pop... |

At this point, two observations should be noted. First, while the invention makes use of a list of one-byte instructions in order to perform the obfuscation technique, and while these instructions are necessarily tied to a particular type of processor, the obfuscation technique itself is not dependent on any particular processor or machine language. Thus, while Table 2 shows the list of one-byte instructions for the INTEL x86/PENTIUM processors, one could just as easily make a list of one-byte instructions for any other model or make of processor—e.g., Motorola, Mips, Sparc, etc. Thus, while a list like the one shown in Table 2 would have to be separately created for each such processor, the obfuscation technique of the present invention can be applied regardless of the processor involved.

Second, while Table 2 shows a list of one-byte instructions, as noted above the invention is not limited to one-byte instructions. In theory any type of byte (or even sequence of bytes) could be on the list. For example, one could employ the invention to replace two-byte sequences (or three-byte, or four-byte, etc) with two-byte (or three-byte, or four-byte, etc.) instructions. As Table 1 shows, "6A 49" (mnemonic: "push 49h") is a two-byte INTEL x86/PENTIUM instruction that pushes the value 0x49 onto the stack. One could create a list of such two-byte instructions; however, it can readily be appreciated that this list would have to be much larger to capture all potential two-byte instructions. (E.g., one would have to list 256 different two-byte sequences from "6A 00". . . "6A FF" just to capture all of the two-byte instructions beginning with "6A."

Returning now to FIG. 4, it should be noted that FIG. 4 shows the replacement candidates enclosed by a circle. These are the byte that will be replaced in the obfuscation process. Replacement candidates are generally selected at random and, preferably, under two constraints: First, it is possible to select the percentage of code that one wishes to change. It will be recalled that one of the virtues of the invention is that it obfuscates code in a subtle way so that the obfuscated code appears, at first glance, to be legitimate code. Thus, it may be advantageous to select a low percentage of the code to obfuscate (e.g., 10 percent), in which case ten percent of the bytes in the code are selected at random.

Second, as noted above, some bytes may be listed in reloc section 28 (shown in FIG. 1). As noted above, bytes listed in reloc section 28 are bytes that must be changed in the event that executable file 10 is not loaded at its preferred load address, and changing these bytes makes it more complicated to deobfuscate the code, since the byte cannot simply be replaced with its pre-obfuscation value. Thus, in a preferred embodiment, bytes that are subject to change as a result of relocating executable file 10 are not changed during the obfuscation process.

FIG. 5 shows program 400 after the obfuscation process of the present invention has been applied to it. In particular, replacement candidates 402 having been replaced with different values that correspond to one-byte instructions. The result is that program 400 has the same number of bytes both before and after obfuscation, but some of the bytes are different.

Table 3 shows the disassembled program that results after program 400 has been obfuscated.

TABLE 3

| MemLoc | Numeric | Mnemonic | |
|---|---|---|---|
| FunctionA: | | | |
| 66603BB1 | 55 | push | ebp |
| 66603BB2 | 8B EC | mov | ebp, esp |
| 66603BB4 | 83 EC 58 | sub | esp, 58h |
| 66603BB7 | 42 | inc | edx |
| 66603BB8 | 43 | inc | ebx |
| 66603BB9 | 18 00 | sbb | byte ptr [eax],al |
| 66603BBB | 74 10 | je | FunctionA + 1Ch (66603bcd) |
| 66603BBD | 6A 49 | push | 49h |
| 66603BBF | 8B 45 18 | mov | eax, dword ptr [pdwHandle] |
| 66603BC2 | 4D | dec | ebp |
| 66603BC3 | FF 15 50 10 60 66 | call | dword ptr [__imp__WriteFile@20 (66601050) |
| 66603BC9 | 54 | push | esp |
| 66603BCA | C0 74 GA B8 03 | sal | byte ptr [edx + ecx-48h], 3 |
| 66603BCF | 40 | inc | eax |
| 66603BD0 | 00 80 E9 1A 01 00 | add | byte ptr [eax + 11AE9h], al |
| 66603BD6 | 00 8B 4D 18 C7 01 | add | byte ptr [ebx + 1C7184Dh], cl |
| 66603BDC | 43 | inc | ebx |
| 66603BDD | 00 00 | add | byte ptr [eax], al |

TABLE 3-continued

| MemLoc | Numeric | Mnemonic | |
|---|---|---|---|
| 66603BDF | 00 33 | add | byte ptr [ebx], dh |
| 66603BE1 | D2 49 D2 | ror | byte ptr [ecx-2Eh[, cl |
| 66603BE4 | 75 D1 | jne | FunctionA + 6 (66603bb7) |
| 66603BE6 | 8B 45 08 | mov | eax, dword ptr [this] |
| 66603BE9 | 33 C9 | xor | ecx, ecx |
| 66603BEB | 52 | push | cdx |
| 66603BEC | 48 | dec | eax |
| 66603BED | 54 | push | esp |
| 66603BEE | 85 C9 | test | ecx, ecx |
| 66603BF0 | 75 0A | jne | FunctionA + 4Bh (66603bfc) |
| 66603BF2 | B8 01 93 04 80 | mov | eax, 80049301h |
| 66603BF7 | E9 F5 00 00 00 | jmp | e_Exit + 30h (66603cf1) |

As can be seen from a comparison between Table 1 and Table 3, the obfuscated code (Table 3) looks very much like actual code. A disassembler is able to "make sense" of the code. A detailed analysis of the obfuscated code may ultimately reveal that the code would not do anything useful and/or would crash. (E.g., the fourth and fifth lines of the obfuscated program increment the "edx" and "ebx" registers, respectively, even though neither register has been initialized by the function.) However, because Table 3 looks so much like real code, it serves some of the purposes of obfuscation, since it obscures the operation of the code from which it is derived, and also may cause a hacker to waste time analyzing its functionality if the hacker does not realize that he is analyzing obfuscated code.

Exemplary Healing Table

When code has been obfuscated in the manner described above, there must be some way to "deobfuscate" the code—i.e., to turn the obfuscated code back into the original code. FIG. 6 shows a healing table 600, which aids in the deobfuscation process. Healing table 600 is created when the code is obfuscated. The healing table contains a record of what bytes in the code have been changed, and what they need to be changed back to in order to reconstruct the original code.

Exemplary healing table 600 includes columns for a function index 602, an offset 604, and an old value 606. Each line in healing table 600 represents a changed byte that needs to be changed back in order to deobfuscate the code.

Function index 602 is an identifier that identifies the function of which a changed byte is a part. For example, if FunctionA (shown in Tables 1 and 3 above) is assigned the identifier 0, then all lines in healing table 600 that relate to bytes in Function A will have 0 in the function index column. In a preferred embodiment, executable 10 (shown in FIG. 1) has a single healing table 600, which lists all of the changed bytes from all functions. Function index 602 is thus a convenient way to identify which bytes are associated with a particular function. Also, it should be noted that it is preferable to fully deobfuscate a function at the time the function is called. Thus, when a function is called, it is possible to look in healing table 600 and to use function index 602 to identify all of the bytes associated with that function, so that all of those bytes can be changed back before the function begins to execute. Function index 602 is a convenient way to identify all of the changed bytes from a function, so that those bytes can all be changed back when the function is called.

Offset 604 is the offset into the function of a changed byte. For example, the beginning of a function may be offset zero, and offset column 604 may specify a byte relative to the beginning of the function. However, it should be understood that the position of the changed byte can be represented in other ways.

Old value 606 is the value that a byte had before it was changed by the obfuscation process.

It should be noted that healing table 600 need not contain the new (i.e., post-obfuscation) value for a byte, since the deobfuscation process does not care what the obfuscated version of the byte is; the deobfuscation process only cares what the original version of the byte is, so that the byte can be changed back to the original. After a deobfuscated function has been used, it may be "re-obfuscated". The function can be re-obfuscated simply by consulting healing table 600 to identify all of the originally obfuscated bytes, and replacing those bytes with new values; however, it is not necessary to change these bytes to the same values that they had the previous time that the function was obfuscated. There is no need to store the obfuscated values of bytes, since new obfuscated values can simply be generated when a function needs to be reobfuscated.

Exemplary Executable with Obfuscated Code

In general, when one seeks to obfuscate code, one starts with an ordinary, unobfuscated executable file, such as executable file 10 shown in FIG. 1. After the obfuscation takes place, the executable must be modified somewhat in order to allow it to execute properly with the deobfuscated code. In particular, healing table 600 should be incorporated into the executable, so that a deobfuscator can replace the changed bytes in a function with the original bytes (although a block of space in the data section is preferably reserved for healing table 600 at the time that the executable is originally compiled, so that healing data can simply be inserted into this reserved space without resulting in a change to the size of the executable). Additionally, code that performs the deobfuscation should be added to the executable, along with deobfuscation triggers that cause the functions to be reobfuscated. Moreover, triggers and deobfuscation code may change certain parameters of the executable (e.g., its checksum), so these parameters within the executable should be changed accordingly.

Figure 7:
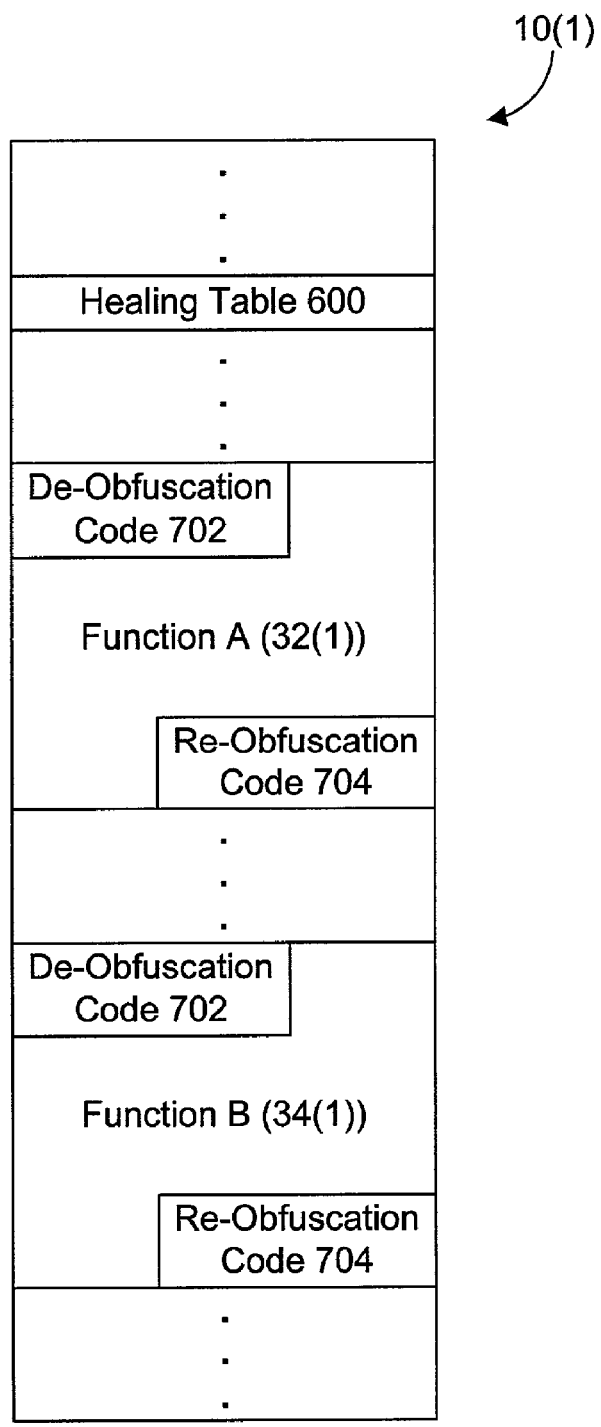
FIG. 7 is a block diagram of an executable that has been modified to incorporate obfuscated code and to support de-obfuscation of that code.

FIG. 7 shows executable 10(1), which is a version of executable 10 that has been modified to accommodate the obfuscation of functions 32 and 34. Executable 10(1) contains the features of executable 10 (e.g., header 11, sections 18-28, etc.). However, executable 10(1) differs from executable 10 in various respects. First, executable 10(1) includes healing table 600. Second, functions 32 and 34 have been replaced with functions 32(1) and 34(1), which are obfuscated versions of functions 32 and 34, respectively. Third, deobfuscation code 702 has been added to the beginning of functions 32(1) and 34(1). Deobfuscation code 702 causes functions 32(1) and 34(1) to be deobfuscated when they begin to execute. (Deobfuscation code 702 may be "in-line" code that performs the deobfuscation. Alternatively, deobfuscation code 702 may be merely a call to a function that performs the deobfuscation.) Additionally, functions 32(1) and 34(1) also preferably include a re-obfuscation instruction 704, which causes the function to be re-obfuscated when its execution is complete.

In a preferred embodiment, healing table 600 is stored within executable 10(1) in a "scrambled" form. The purpose of such scrambling is to obfuscate healing table 600 itself, since the existence of healing table 600, if detected by a hacker, would signal that some of the code in executable 10(1) is obfuscated. As noted above, one of the advantages of the invention is that the obfuscation is sufficiently subtle that the obfuscated nature of a piece of code may not be obvious upon a cursory inspection of the code. Scrambling healing table 600 helps to hide the fact that code has been obfuscated. Cryptographic security of healing table 600 is not necessary. What is desired is merely some level of obscurity. For example, healing table 600 can be XOR'd with a known value. This XOR technique allows the content of healing table 600 to be recovered easily, while making its presence within executable 10(1) somewhat more obscure that it would be if healing table 600 were stored in the clear.

Exemplary Obfuscation Process

Figure 8:
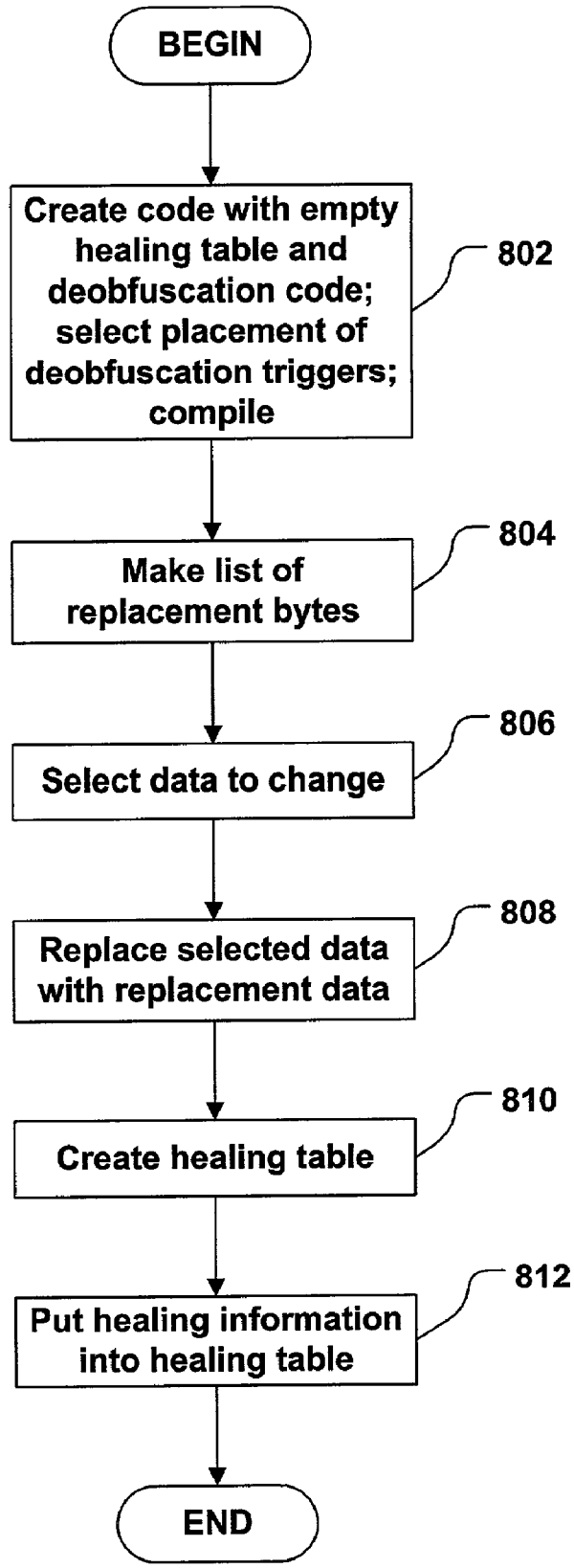
FIG. 8 is a flow diagram of an exemplary code obfuscation process.

FIG. 8 is a flowchart showing an exemplary process for obfuscating code in accordance with the invention.

At step 802, the executable is created in a manner that prepares it for obfuscation. This step includes creating an empty healing table so that the healing data can be stored without disrupting the size of the executable, and also involves selecting the place for the deobfuscation code and/or triggers (which, in general, must be chosen such that any obfuscated function will be deobfuscated before it is called). Ideally, the placement of the deobfuscation code and/or triggers should be chosen so that these are not obvious, since finding the code and/or triggers would help a hacker to analyze the obfuscated code.

At step 804, a list of replacement bytes is created. As described above, the obfuscation technique of the present invention, in a preferred embodiment, involves replacing randomly selected bytes with one-byte instructions. Thus, step 804 preferably comprises creating a list of one-byte instructions that can be used to replace the randomly-selected bytes.

At step 806, the bytes that are to be changed are selected. As described above, code is preferably obfuscated on a per-function basis—i.e., a particular function is selected for obfuscation, and then bytes to be changed within that function are selected. Thus, after a function has been identified to obfuscate, bytes within that function are randomly selected. As described above, some bytes may be specifically avoided in this random selection process—e.g., if a byte is subject to being changed if the code is relocated (see discussion of reloc section 28 above).

At step 808, the bytes selected for change at step 806 are replaced with new bytes. As noted above, these new bytes are preferably taken from the list of one-byte instructions for the platform on which the code will operate. Typically, these bytes will be chosen from the list created at step 804.

At step 810, a healing table (e.g., healing table 600, shown in FIG. 6) is created to aid in the deobfuscation of code prior to its execution. While step 810 is shown below step 808 in FIG. 8, it should be noted that the healing table does not have to be created subsequent to the replacement of bytes in the original code. In fact, the healing table is preferably created while the bytes are being replaced.

At step 812, the healing table is added to the executable—preferably into the space that was reserved for it when the program is recompiled. It should be noted that deobfuscation and reobfuscation code and triggers are preferably not written into the executable at this time; preferably, the code and triggers were created at the time the original code was compiled, with a view toward which functions would eventually be obfuscated. Thus, the obfuscation process is simplified, since the obfuscation tool only needs to change individual bytes of code and to insert the healing data into the space reserved for the healing table. An example of an executable rewritten according to step 812 is discussed above in connection with FIG. 7.

The result of the process of FIG. 8 is a complete executable (e.g., the executable shown in FIG. 7) that contains obfuscated code and is ready to be used by a computer.

Exemplary Deobfuscation Process

Figure 9:
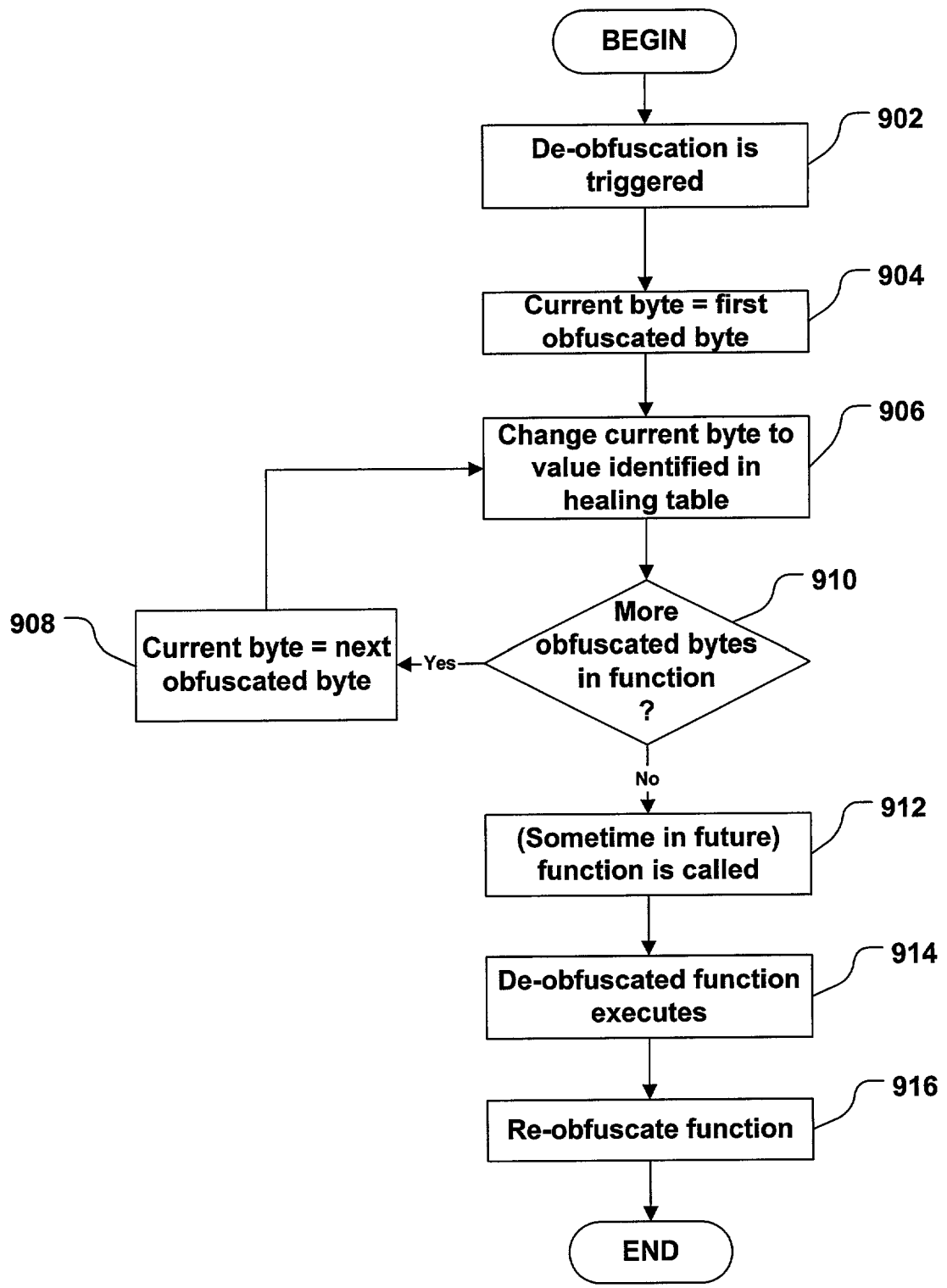
FIG. 9 is a flow diagram of an exemplary code de-obfuscation process.

Sometime before an obfuscated function is called, it must be deobfuscated. FIG. 9 shows a process for deobfuscating and using an obfuscated function.

At step 902, the deobfuscation process is triggered. Deobfuscation is triggered at some point in time before the function is called. Deobfuscation should not be triggered too great a time before the function is actually used, since this would expose the function in the clear for longer than necessary. However, ideally the deobfuscation is not always performed immediately before the function is called (and may, in fact, be performed multiple times), since part of the obfuscation process may include choosing the deobfuscation triggers in such a way that the triggers are more difficult for a hacker to find. Once deobfuscation is triggered, deobfuscation code 702 (shown in FIG. 7) may be executed to deobfuscate the function.

Once deobfuscation has been triggered, the process of deobfuscating the code comprises changing, one-by-one, all of the obfuscated bytes back to their original bytes. At first, the current byte to be changed is the first obfuscated byte (step 904). The current byte is changed back to its pre-obfuscation value. This pre-obfuscation value is determined, preferably, by looking up the value on healing table 600. Step 9 1 0 determines whether there are additional bytes in the function that need to be deobfuscated. If there are such additional bytes, then the current byte is set to the next obfuscated byte in the function (step 908), and the process returns to step 906 to replace that byte with its original value. If step 910 determines that there are no more obfuscated bytes to deobfuscate in the function, then the function is ready to execute. At some subsequent point, the function is called (step 912), and execution of the function proceeds (step 914).

Following execution of the function, the function is optionally reobfuscated (step 916). As discussed above, reobfuscation may be performed by consulting healing table 600 to determine which bytes had been changed in the original obfuscation process, and replacing those bytes anew with different values.

Exemplary Computing Environment

Figure 10:
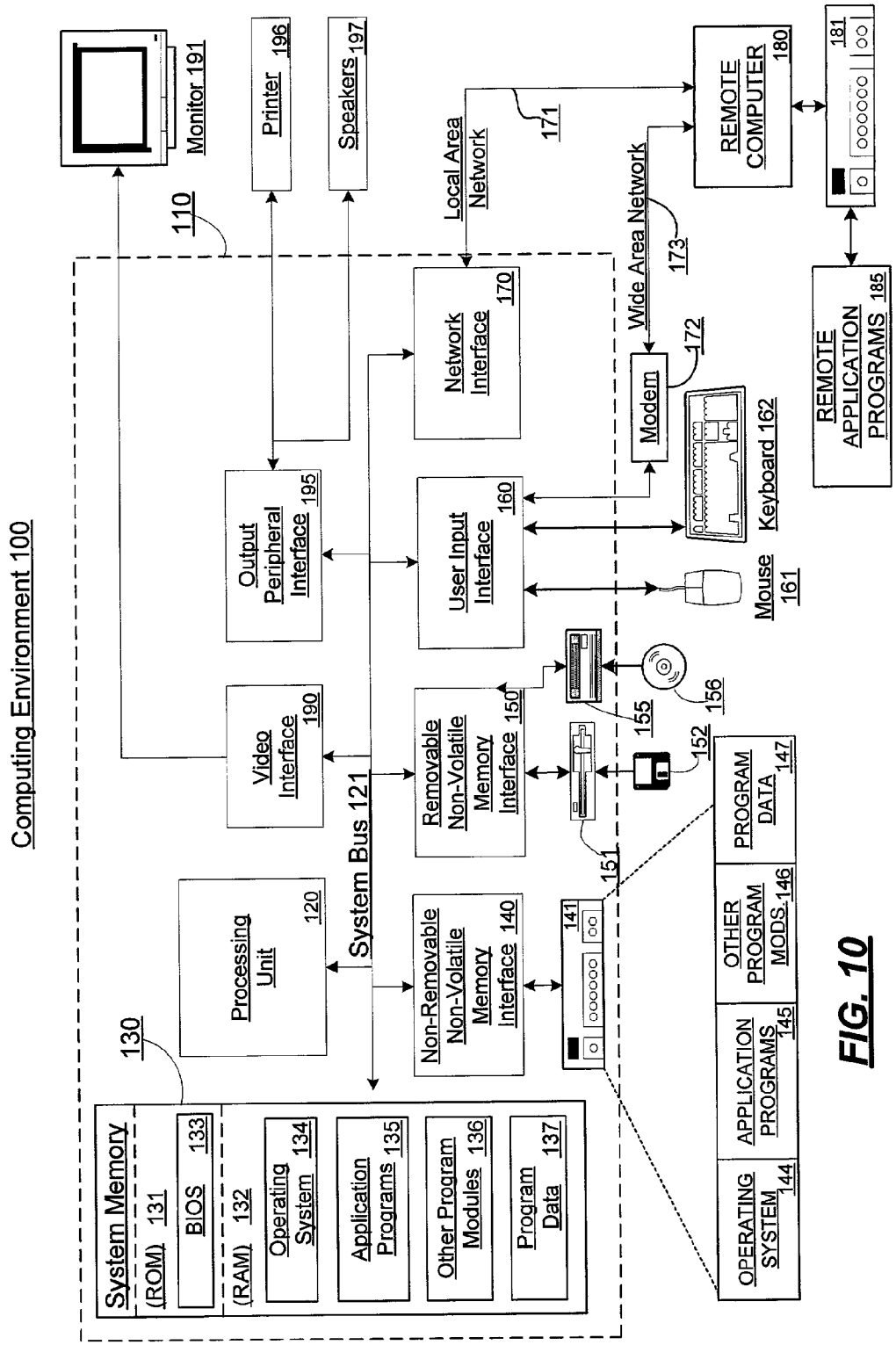
FIG. 10 is a block diagram of an exemplary computing environment in which aspects of the invention may be implemented.

Inasmuch as the above-described invention relates to computing, FIG. 10 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of obfuscating a unit of code that executes on a processor, the method comprising:

selecting a plurality of bytes in said unit of code;

replacing each of the bytes with a replacement byte selected from a list of bytes corresponding to instructions from the instruction set of the processor to create an obfuscated code unit having the same number of bytes as said unit of code, wherein:

said instructions comprise a list of one-byte instructions;

each of the replacement bytes is a one-byte instruction; and said unit of code comprises at least some address data that is subject to being changed depending upon where in memory the unit of code is loaded other than at a preferred load address, and wherein the method further comprises:

omitting said address data from the plurality of bytes selected by said selecting step;

creating a table indicative of the bytes prior to said replacing step; and storing in an executable file at least:
said obfuscated code unit; and
said table.

2. The method of claim 1, wherein the number of bytes selected by said selecting act is based on a specified percentage of code to be obfuscated.

3. The method of claim 1, wherein said selecting step selects said plurality of bytes randomly.

4. The method of claim 1, wherein the table comprises, for each of the plurality of bytes:

a location of the byte; and a value of the byte prior to replacement of the byte with a new value.

5. The method of claim 1, wherein said unit of code is one of a plurality of functions contained in an executable file, and wherein said table further comprises:

an identifier which identifies said function.

6. The method of claim 1, further comprising:

including deobfuscating code in said obfuscated code unit, said deobfuscating code being operative to use said table to restore said bytes to the values the bytes held before the bytes were replaced with replacement bytes, thereby producing a deobfuscated code unit, wherein said deobfuscating code is executed before invocation of said obfuscated code unit.

7. The method of claim 6, further comprising:

selecting a position in the unit of code for said deobfuscating code to be called.

8. The method of claim 6, further comprising:

including reobfuscating code in said obfuscated code unit, said reobfuscating code being operative to use said table to identify bytes in said code that have been previously replaced, and to replace at least some of the previously-replaced bytes with new values, wherein said reobfuscating code is executed after said deobfuscated code unit has completed execution.

9. The method of claim 1, further comprising:

performing an exclusive OR operation between said table and a predetermined value to convert said table to a scrambled form, and wherein said storing act stores said table in said scrambled form.

10. The method of claim 1, wherein the unit of code comprises a function within an executable file, wherein a map exists which indicates the offset at which each function in the executable file is located, and wherein the method further comprises:

consulting the map to determine the boundaries of the unit of code.

11. A computer-readable storage medium encoded with instructions that are executable on a processor, the instructions being adapted to perform acts comprising:

consulting a function index contained in a healing table for identifying at least one function among a plurality of functions, the one function having a plurality of bytes that have been changed for obfuscating the function, wherein a number of bytes in the plurality of bytes is the same before and after being changed;

consulting offset information contained in the healing table for identifying positions of each of the plurality of bytes in the function, wherein said offset information identifies positions of each of the plurality of bytes with reference to the beginning of the function;

consulting old value information contained in the healing table for restoring said plurality of bytes to the values identified in said healing table to create a unit of deobfuscated code which is executable on the processor.

12. The computer-readable storage medium of claim 11, wherein the instructions further adapted to perform acts comprising:

reobfuscating said deobfuscated code after said deobfuscated code executes.

13. The computer-readable storage medium of claim 12, wherein said reobfuscating act comprises:

consulting said healing table to determine which bytes in said deobfuscated code had originally been obfuscated; and changing at least some of the deobfuscated bytes to new bytes.

14. The computer-readable storage medium of claim 11, further comprising:

accessing a scrambled healing table; and performing an exclusive OR operation between said scrambled healing table and a predetermined value to recover said healing table.

15. A computer-readable storage medium having encoded thereon data comprising:

an obfuscated function;

a healing table which comprises:

a list of bytes in said obfuscated function;

offset information for identifying positions of each of the bytes in said list, wherein said offset information identifies positions of each of the bytes with reference to the beginning of said list;

the values to which the bytes in said list are to be changed in order to turn said obfuscated function into a non-obfuscated function having the same number of bytes as the obfuscated function; and deobfuscation code which accesses said healing table and which changes the bytes listed in the healing table to their listed values.

16. The computer-readable storage medium of claim 15, wherein said deobfuscation code is adapted to be executed at the time said obfuscated function is called.

17. The computer-readable storage medium of claim 15, wherein said data further comprises:

reobfuscation code which changes at least some of the bytes in the deobfuscated function to new values, the bytes to be changed being based on the bytes listed in the healing table.

18. The computer-readable storage medium of claim 15, further comprising:

a plurality of functions, said obfuscated function being among the plurality of functions, and wherein the healing table further comprises:

identification data which indicates, for each byte, which of the plurality of functions the byte is associated with.

19. A system for creating obfuscated code comprising:

memory for storing a list of instructions;

a processor comprising an obfuscator which randomly selects bytes in machine code and which creates obfuscated code having the same number of bytes as said randomly selected code by replacing the selected bytes with bytes that are on said list, wherein:

said instructions comprise a list of one-byte instructions, said obfuscator replaces the selected bytes in the machine code with one-byte instructions on said list; and said obfuscator accesses a reloc list that indicates which address bytes in said machine code are subject to change based on where said machine code is loaded into memory, and wherein said obfuscator does not replace these address bytes on said reloc list;

the processor further comprising a table creator which creates a table indicative of bytes within the machine code that have been replaced and their pre-replacement values; and a packager which creates an executable file comprising said obfuscated code and said table.

20. The system of claim 19, wherein said obfuscator is adapted to receive an indication of a percentage of code to be changed, and wherein the number of bytes identified by said obfuscator is based on said percentage.

* * * * *